May 31, 1960 D. F. SKLAR 2,938,377
HARDNESS TESTERS
Filed Sept. 13, 1951 3 Sheets-Sheet 1

INVENTOR DAVID F. SKLAR
BY H. M. Kilpatrick
ATTORNEY

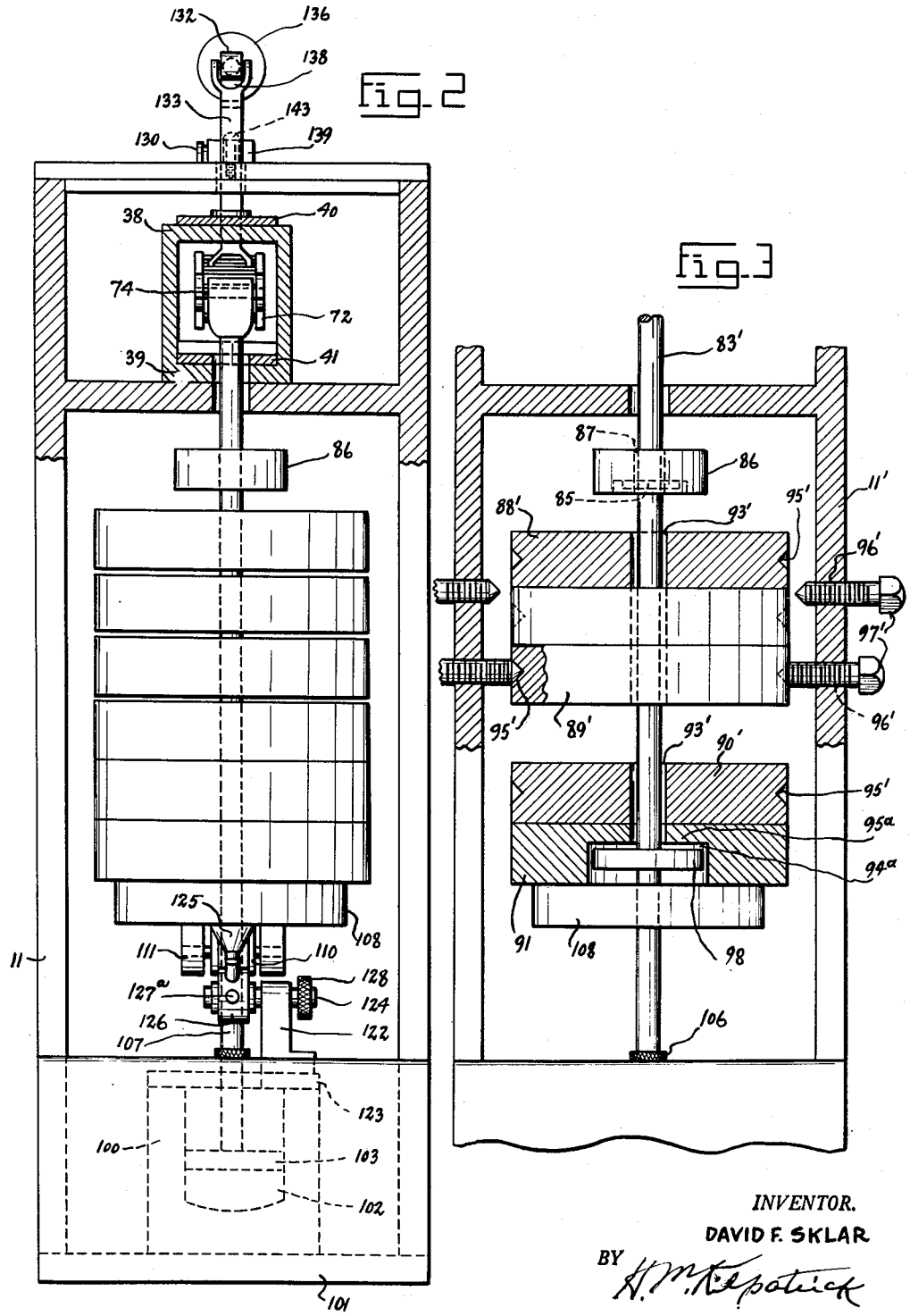

May 31, 1960   D. F. SKLAR   2,938,377
HARDNESS TESTERS
Filed Sept. 13, 1951   3 Sheets-Sheet 3
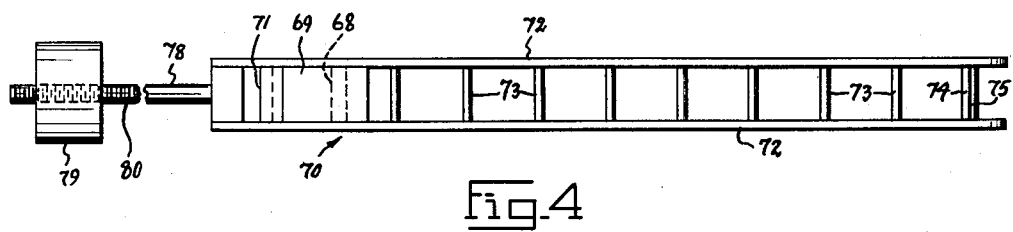
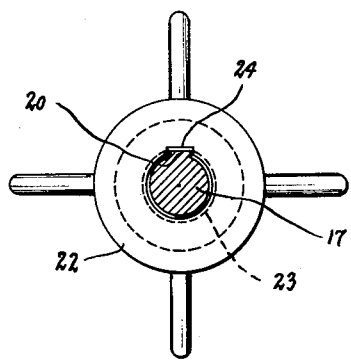
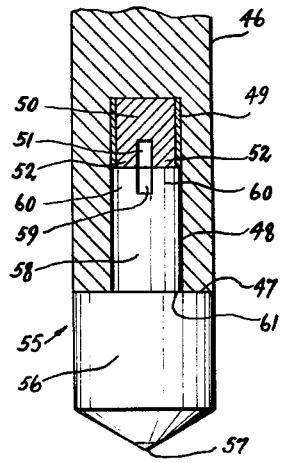
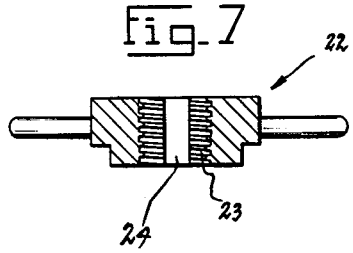
INVENTOR.
DAVID F. SKLAR
BY
ATTORNEY

United States Patent Office 2,938,377
Patented May 31, 1960

2,938,377

HARDNESS TESTERS

David F. Sklar, Kent Cliffs, N.Y., assignor to The Torsion Balance Company, Clifton, N.J., a corporation of New York Filed Sept. 13, 1951, Ser. No. 246,376

22 Claims. (Cl. 73—83)

This invention relates to apparatus for testing the hardness of articles, parts or the like of metal or other material and more particularly to improvements in hardness testers of the general type shown in United States Patents Nos. 1,516,207 and 1,516,208 issued November 18, 1924 to S. P. Rockwell having means for successively applied major and minor loads to the indentor which indents the test piece being tested.

Objects of the invention are to provide an improved machine or apparatus of this kind which is easily and quickly adaptable for either superficial testing or regular testing.

Heretofore separate testers of the above type were used for regular and superficial testing. The cast steel or other type of beam used for applying the major load for regular testing was too heavy and applied too much pressure to the indentor for superficial testing. On the other hand, the light weight beam used for superficial testing was not strong enough for the pressures required for regular testing.

The nitriding process for the surface hardening of steel called for a tester (the superficial tester) capable of measuring the hardness of the surface itself, not the hardness of a thick layer. The regular Rockwell hardness tester, which may have a major load up to 150 kg. penetrates much too deeply for superficial testing.

The big difference between superficial and regular testing is in the loading and sensitivity. The initial or minor load in superficial testng is 3 kilograms or thereabout, and the major load may be 15, 30 or 45 kilograms, depending upon the thickness in case hardening. Whereas in regular testing hardened tool steel is penetrated to the depth of about 0.0035 inch on a regular Rockwell "C" scale test, the superficial test will, on metal of the same hardness and with the customary 30 kg. major load, penetrate to only about 0.0010 inch in depth.

The power beam, hanger rod and weight pan of machines heretofore in use for regular testing, strong enough for the 150 kg. major load for regular testing are so heavy, even with all weights removed, that they exert much more pressure on the indentor than the 3 kg., 15 kg. or 30 kg. that may be required for superficial testing; while the power beams of superficial testers heretofore in use which must be light, so as not to exert too much pressure on the indentor during the minor load, are not strong enough for the 150 kg. pressure on the indentor which may be required for regular testing.

Therefore, a further object of the invention is to provide a tester which will not exert too much pressure on the indentor for superficial testing, but will be able to exert sufficient pressure for regular testing.

To this end further objects of the invention are to provide an improved strong light weight beam suitable for either superficial or regular testing.

Another object of the invention is to provide means for reducing, compensating for, or eliminating the pressure of the beam itself on the indentor, to allow either a light or a heavy beam to be used for superficial testing, and to allow the indentor pressure to be controlled entirely by the minor and major load weights.

A further object of the invention is to provide a ratio-changing connection between the indentor and the indicator pointer of the dial gauge adapting the gauge for both superficial and regular testing, and to provide means for automatically adjusting the beam-weight compensation when the ratio of the gauge connection is adjusted.

Other objects of the invention are the elimination of load springs and their necessary repeated calibration and to provide an improved arrangement using dead weights for both major and minor loads, and to provide means for slowly or quickly raising and lowering the test piece to and from the indentor.

Additional objects of the invention are to effect simplicity and efficiency in such testers and to provide an extremely simple tester of this kind which is easy to operate and is rapid, durable, reliable and adaptable in operation for testing various materials, and is economical to manufacture.

The inventive features for the accomplishment of these and other objects are shown herein in connection with a hardness tester having an elevating post vertically slidable in the tester base and having means for at will slowly or quickly raising the post toward an arm supported over said post and carrying a vertically movable downwardly extended plunger over the post having at its lower end magnetic means for holding an indentor. A fabricated light weight beam light enough for superficial testing and strong enough for regular testing is fulcrumed at one end on the arm and operatively connected near said end to the plunger and carries counter-balancing means for relieving part of the pressure of the beam on the plunger and carries a hanger rod on its free end on which are supported minor and major load weights.

A dash pot beneath said weights supports on its piston rod a weight carrier engageable with the lowest weight. A lifting lever lifts the carrier and weights thereon; and selecting means are provided for selectively holding lifted weights from the hanger rod, thereby to adjust the effective load to the hardness of the metal to be tested. Two arrangements for effecting this adjustment are shown.

An operative connection between the dial gauge and the indentor also serves to relieve part of the beam pressure from the indentor and is adjustable for changing the ratio of said connection, thereby adapting the tester for regular and superficial testing.

In the accompanying drawing showing, by way of example, two of many possible embodiments of the invention, Fig. 1 is a longitudinal vertical sectional view, partly in elevation, showing the tester with one form of major load weight selecting means;

Fig. 2 is a rear elevation, partly in section, of the tester of Fig. 1;

Fig. 3 is a rear elevation, of the tester partly in vertical section, showing a modified form of the weight selecting means;

Fig. 4 is a plan of the beam;

Fig. 5 is a vertical sectional view, partly in elevation, showing the indentor chuck attachment to the plunger;

Fig. 6 is a plan of the hand wheel for raising the elevating post; and

Fig. 7 is an axial section, partly in elevation, of the hand wheel.

Figure 1:
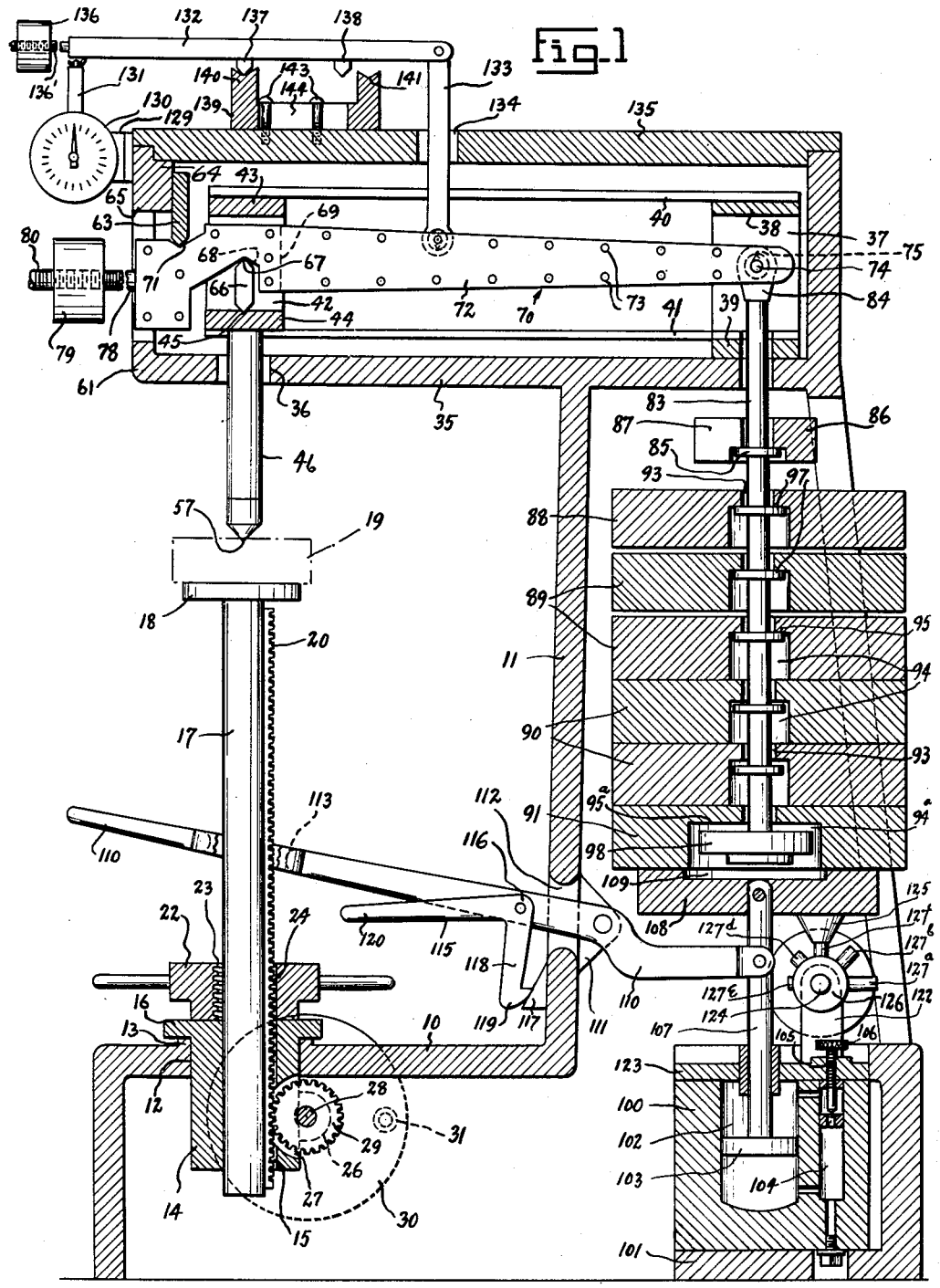

The various parts of my improved testers of Figs. 1 to 7 are carried on an elongated hollow base 10 having a hollow standard 11 on its rear end, and having near the front end an axially vertical opening 12 surrounded by a boss 13 and receiving fast therein a bearing bushing 14 having an inner vertical slide-way 15 and having at its upper part a flange 16 resting on the boss 13.

An elevating post 17 vertically slidable in said bushing 14 is provided at the top with a test piece support 18 for the test piece 19. Means such as the parts now to be described are provided for quickly and then slowly raising the elevating post. This post is provided at one side with a vertical rack 20 extending substantially from end to end and slidable in said way 15 and provided with rack teeth of helical inclination forming short interrupted screw threads for the post. An internally threaded hand wheel 22 resting on the bushing and rotatively received on the post is provided with internal threads 23 (Fig. 7) adapted to mesh with said rack teeth 20 for slowly raising the post as the wheel rotates. The wheel is also provided with a vertical slot 24 interrupting the threads, and adapted to slidably receive the rack 20.

The bushing 14 is provided on one side with a pair of horizontally alined bearing ears 26 and an opening 27 therebetween adjacent to the rack. An operating shaft 28 rotatably supported in said ears and passing through a wall of the base, carries a pinion 29 meshing with the rack. An actuating wheel 30 on the shaft 28 exterior to the base carries a hand crank 31 whereby when said slot 24 receives the rack 20, the post may be quickly raised and lowered.

A hollow arm 35 is mounted on said standard over said base and is provided at the front end with a lower opening 36 alined with said post and in which is disposed the penetrator plunger 46 described below. Suitable means such as those now to be described are provided for guiding the plunger. A fixed frame-like box 37 is mounted fast in the rear end of the arm, providing horizontal upper and lower members 38, 39 across the arm. Parallel horizontal flexible spring metal strips or plates 40, 41 mounted on the upper faces of said members extend horizontally too near the front end of the arm, where there is disposed a frame-like movable box 42 having upper and lower members 43, 44 transverse to the arm over said opening 36 and respectively secured fast flat against the inner faces of said strips 40, 41.

The lower member 44 of the movable box is provided in its upper face with an upper bearing seat 45 and at the lower face with a downwardly extended penetrator-carrying plunger 46 passing through said opening 36 over the test-piece support. The strips 40, 41 hold the plunger at all times in axial alinement with the path of its vertical movement.

The plunger 46 is provided with a lower flat face 47 (Fig. 5) accurately perpendicular to the axis and path of movement of the plunger when the indentor engages the test piece. The plunger has in its lower part an axial bore 48 perpendicular to and intersecting said face 47, in the upper part of which bore a bushing of non-magnetic metal 49 is fitted fast and receives a cylindrical magnet 50 fitted fast in said bushing and provided with a deep diametric slot 51 in its lower end forming two lower magnet poles 52. If the plunger 46 is of non-magnetic material the bushing 49 may be omitted and the magnet fitted fast in the bore. A penetrator chuck 55 at the lower end of the plunger comprises a penetrator chuck body 56 having a lower indentor point or ball 57 and an upper cylindrical shank 58 of magnetic material accurately fitting in said bore 48 and provided with an upper diametric slot 59 forming two upwardly projecting pole pieces 60 adapted to be attracted and engaged by said magnet poles to hold the penetrator chuck in place. Said slot 59 may be omitted if desired. Said chuck body has an upper face 61 accurately perpendicular to the axis of the plunger and engageable with accurate fit flat against said lower flat face 47 of the plunger. Heretofore it was necessary that the faces 47, 61 be accurately perpendicular to the axis of movement of the plunger; but by providing close accurate fit of the shank 58 in the bore 48, the axial pull of the magnet makes accurately perpendicular faces 47, 61 unnecessary.

To assemble the chuck on the plunger it is only necessary to put it in place, with the shank in contact or near contact with the magnet. The magnet will draw the shank fully into the bore and hold it there with more force than is required for operation. To remove the chuck, it is only necessary to pull it out, excessive force being not necessary.

This magnetic chuck holder is quite an advance in this art. Heretofore, the indentor has been held in place by a radial set screw in the plunger pressing against a flat on the side of the penetrator chuck shank. This has always caused trouble causing lack of parallelism between the faces 47, 61 of the chuck and plunger, such that the application of the major load caused these faces to shift and meet during such application, thus causing errors of measurement. The spring pressure holding device of my patent No. 2,362,941 is a great improvement over the set screw device; but even with this improvement there is a tendency for the spring to press the two faces out of parallelism. The herein magnetic holding device eliminates all side thrust by providing a direct axial pull by the magnet as shown. This eliminates the necessity of milling flats on the indenter chuck shank, which has always been one of the major causes of lack of squareness between the penetrator shank and shoulder.

A downwardly pointed elongated fixed knife edge 63 is mounted on the inner thickened upper part 64 of a front end wall 65 transverse to the arm 35 near and frontwardly off-set from the movable box 42. A pointed vertical member or post 66 disposed in the movable box 42 has its lower end seated in said upper seat 45 and an upper bearing end 67 disposed substantially as high as said fixed edge 63 and receiving a lower seat 68 of a block 69 (Fig. 4) of a fabricated beam 70 extending longitudinally substantially from end to end of the arm. Particularly in superficial testing it is desirable that the beam shall not press the indentor with too great a force against the test piece. I provide various means for avoiding or preventing such excessive pressure, such as means for biasing the beam upwardly and by providing a light fabricated beam such as the beam 70. Said beam 70 comprises said block 69 having upper and lower seats 71, 68 receiving the fixed knife edge 63 and said upper bearing end 67 respectively, and spaced side plates 72 secured to the sides of said block. Said side plates may be of aluminum or other metal and extend to the rear of the arm, and are connected by transverse rivets 73 rigidly connecting the plates at the margins of the plates. A knife edge pin 74 having an upwardly pointed knife edge 75 connects the free ends of the plates. A threaded rod 78 secured in the front end of the block 69, substantially in alinement with the axis of the beam carries a counterbalancing weight 79 adjustably secured on the threads 80 of the rod to counter balance in part the weight of the beam.

By constructing the beam as thus described I provide a beam which is strong enough for regular testing and is at the same time light enough for superficial testing. The fulcrum end of the block 69 serves to help counterbalance the beam with or without the counterbalancing weight 79 and rod 78 which may be omitted if desired. The counterbalance reduces beam pressure on the indentor to facilitate superficial testing.

A hanger rod 83 having an upper ring 84 suspended on said knife edge pin 74 is thereby suspended from the active free rear end of the beam and hangs in said standard 11 and there carries a disk-like minor load support or pan 85 fast on the hanger rod near the arm 35 and adapted to support a removable minor load adjusting weight 86 provided with a radial slot 87 adapted to receive the rod. The weight 86 may be removably placed on said support to adjust the effective minor load for regular testing as later explained.

In adapting the tester for superficial or regular testing and for testing materials of different hardness, I select the number of major load weights to be applied to the rod and provide means such as the two constructions described below for applying the selected weights.

In one construction, major load weights 88, 89, 90, 91 (Fig. 1) on said rod disposed a distance below the adjustable weight 86, are provided with central openings 93 receiving the hanger rod and having deep lower countersunk recesses 94, 94a forming at the upper part of the weights downwardly facing shoulders 95, 95a adapted to engage a set of spaced supporting disks or pans 97, 98 in said recesses respectively and fast on the hanger rod and engageable with said shoulders 95, 95a and spaced apart a distance greater by a small fraction of an inch than the distance between the adjacent shoulders 95, 95a when the weights are in contact with each other, whereby the major load weights may be all supported on the hanger in slightly spaced relation. The lowest disk or pan 98 is larger than the others and is a minor load weight and cooperates with the beam 70, hanger rod 83 and said adjusting weight 86 when present to provide the minor load.

A dash pot 100 mounted on a lower horizontal web 101 in the base below the hanger rod is provided with a vertical cylinder 102 closed at both ends, a piston 103 therein, a relief passage 104 by-passing the piston, an adjustable valve 105 having an exterior manipulating head 106 for adjustably partially closing the passage, and a piston rod 107 alined with the hanger rod and projecting upwardly from the dash pot and carrying a weight carrier and lifter 108 mounted on the upper end of the piston rod and engageable with the lowest major load weight 91 to retard downward movement of the weights. The carrier 108 has an upper recess 109 under the minor load disk 98 to avoid contact therewith.

A load lifting lever 110 intermediately fulcrumed between a pair of spaced ears 111 on the inner face of the front wall of the standard 11 and pivoted to the piston rod 107, and extended frontwardly through an opening 112 in the front wall of the standard, projects frontwardly of the elevating post and is provided with a large opening 113 receiving the elevating post 17 without contact therewith, whereby said weight carrier 108 may be raised to lift all the major load weights from their supporting disks.

A bell-crank shaped latch member 115 having its elbow 116 pivotally mounted on the part of the lever 110 over a projection 117 on the front of the standard 11, comprises a lower arm 118 provided with a rearwardly pointed hook 119 adapted to catch under said projection 117 to hold the weight carrier raised. The latch member 115 has a frontwardly downwardly inclined manipulating handle arm 120 adapted to be pressed toward the lever to retract the hook from said projection 117 to release the hook, lever and weight carrier to allow the major load weights to descend retarded by the dashpot.

A bracket 122 (Figs. 1 and 2) extending from the top wall 123 of the dashpot below the weight carrier carries frictionally rotatably therein a spindle 124 disposed under a projection 125 on the lower face of the weight carrier. A collar 126 fast on said spindle is provided with a plurality of radially projecting arms 127a, 127b, 127c, 127d, 127e progressively varying in length by amounts equal to the aforesaid small fraction, mentioned relative to the supporting disks 97 and disposed different distances around the collar, whereby any one of the arms 127 may be set by means of the knurled head 128 fast on the spindle 124 to engage with said projection 125 when the load lifting lever allows the weight carrier to lower, thereby to hold the carrier in position to allow a selected number of weights to engage their supporting disks and thus be applied to the hanger rod. The number of weights to be applied depends upon the hardness of the material, the type of testing and the depth of indentation allowed. The longest arm 127a is long enough to hold all weights except the top weight 88 in contact with each other and from their supporting disks, while the shortest arm 127c is long enough to hold only the bottom weight 91 from the rod. The arm 127e as shown holds the weights 90, 91 from the rod. This arrangement allows the proper major load to be selected either for regular or superficial testing.

In Fig. 3 is shown a modified form of major load adjuster for adjusting the weights on the hanger rod 83' on the free end of the beam and disposed in said standard 11 and carrying a lower pan or minor load 98 and an upper minor load support 85 and removable minor load adjusting weight as in Fig. 1. A set of major load weights 88', 89', 90', 91 on said rod are each provided with a central aperture 93' receiving the hanger rod 83', the aperture 93 of the lowest weight being surrounded by a deep countersunk recess 94a forming in its upper part a downwardly facing shoulder 95a receiving said pan 98.

Each weight except the bottom weight 91 is provided with diametrically opposite conical peripheral recesses 95' adjacent to the side walls 11' of the standard 11. Said side walls are provided at different levels above the operating position of the next to the lowest weight with alined tapped holes 96' radial to the hanger rod and with which said recesses 95' may be alined. Set screws 97' in said holes having inner pointed ends adapted to engage in, and disengage from, said recesses 95', allow any selected number of weights to be by the set screws held above the weights or weight below, and thus held from the hanger rod, thus to adjust the effective major load.

I provide mechanism for changing the ratio of the operative connection between the indentor and the dial guage for adapting the tester for superficial and regular testing, and show by way of example one such mechanism, which has the further function of applying upward bias to the beam. This mechanism will now be described.

A bracket 129 on the front end of the arm 35 carries a hardness indicating dial gauge 130 having an upwardly projecting downwardly biased weighted operating spindle 131 to which is pivotally connected a lever 132 having its rear end pivoted to a link 133 pivoted to the beam 70 between the plunger and the hanger rod 83, and extending upwardly through an opening 134 in the cover 135 of the arm 35. The front of the lever 132 is weighted by a weight 136 adjustably carried on a threaded rod 136' in the front end of the lever. The intermediate part of the lever 132 has a pair of downwardly projecting front and rear transverse knife edges 137, 138 disposed fast thereon distances from the link equal to about one half and one fourth the length of the lever. A fulcrum plate 139 longitudinally frictionally slidably mounted on said cover 135 is provided with a pair of upwardly offset transversely disposed front and rear transverse fulcrum engagement seats 140, 141 of shallow V-shaped cross-section further apart than said knife edges and adapted one at a time to engage and pivotally support the respective knife edges 137, 138, to adapt the operating ratio of the gauge for superficial and normal testing. A pair of headed pins 143 fast in the top cover 135 and disposed in a longitudinal slot 144 in the plate are spaced apart to guide the plate longitudinally and limit the movement of the plate, the heads frictionally engaging the plate to hold it in adjusted position.

For regular testing the slide plate 139 will be pushed rearwardly to bring the seat 140 under the knife edge 137 and fulcrum the knife edge 137 in the seat 140, which gives the proper ratio for the pointer of the gauge for regular testing and causes the spindle 131 and weight 136 to cause the lever 132 and link 133 to exert an upward pull on the beam for counterbalancing in part the weight of the beam itself. For superficial testing, the slide plate 139 is pulled frontwardly fulcruming the knife edge 138 in the seat 141, and the ratio movement of the gauge pointer relative to indentor movement is doubled; and also the movement of the weighted spindle 131 and the weight 136 tending to lift the beam is doubled. By adjusting the weight 136, part or all of the weight of the beam can be lifted from the plunger and indentor so the effective weight of the beam can be made neutral so the pressure on the indentor can be controlled entirely by the weights on the hanger rod 83. By this arrangement the same dial and any weight of beam may be used for either superficial or regular testing and the same machine may be used for either superficial or regular testing thus eliminating the expense of the two machines heretofore necessary.

The flexible plates 40, 41 may be free of bias, or may be biased upwardly to assist the weights 79 and 136 in counterbalancing the beam, but it is preferable that the entire counterbalancing be done by the weights, as the bias of the strips 40, 41 changes from age or fatigue, requiring recalibration.

With some materials to be tested, under some conditions the light weight beam without counterbalancing means exerts on the indentor a pressure light enough for superficial testing. Other conditions require more counterbalancing, and the counterbalancing of the weighted fulcrum end of the block 69, or of the weight 79, 131 or 136 on the bias of the spring flexible plates 40, 41 or combinations of these may be used.

There are many users of hardness testers who use both regular hardness testers and superficial hardness testers, and thus have the expense of providing both types of testers. By my ratio changer and fabricated or counterbalanced beam and a major simplification of the mechanical design, I am able to provide, at practically no additional expense, a single testing machine which is instantly adjustable for either superficial or regular testing.

Helical springs heretofore used to apply the minor load lose their strength from continued use. My improved design eliminates spring loaded minor loads, and uses simple lever and dead weights for both major and minor loads the force of which never deteriorates.

The operation of the tester will be understood from the foregoing by those skilled in the testing art and now need be only summarized as follows:

The slide plate 139 is set for superficial or regular testing as the case may be, and the collar 126 is adjusted to allow only the selected number of major load weights 88, 89, 90, 91 to be applied to the hanger rod 83, or those of the weights 88', 89', 90' that are not to be applied to the hanger rod are anchored in upper position by set screws 97'.

Then starting with the elevating post lowered and the lifting lever 110 latched to hold the major load weights from the hanger rod, the test piece 19 is placed on the support 18, the hand wheel 22 is turned to register the slot 24 with the rack, and the actuating wheel 30 is turned to quickly bring the test piece almost into contact with the penetrator. Then the hand wheel 22 is turned to press the test piece against and raise the indentor causing the movable box 42 to rise until the active arm 72, hanger rod 83, and minor load or loads are slightly raised, and the minor load thereby applied, causing a minor load indentation and movement of the pointer of the gauge dial thereby to indicate the proper minor load position of the pointer. The latched weight lifting lever 110 supports the selected major load weights free of the hanger rod permitting free movement of the beam and minor load. The gauge dial may be rotated to zeroize the dial at the minor load position of the pointer.

Then the weight lifting lever is unlatched allowing the weight carrier 108 and major load weights to sink slowly as retarded by the dashpot 100 until the downward movement of the selected major load weights are applied to the supporting disks or pans 97 or 98 and hanger rod and add their weights to the beam thereby pressing the indentor further into the test specimen.

When the major load weights have pressed the indentor into the specimen as far as the hardness of the material will permit thereby forming the major load indentation, the lifting lever 110 is lowered and latched, thereby lifting the major load weights and moving them upward from the supporting pans or pan. This leaves the indentor still in the indentation, and the difference in position of the indentor in the major load indentation as compared with the indentor position in the minor load indentation will represent the change of depth from minor load to major load indentation, which will in turn be indicated on the dial gauge.

This completes the test. The elevating post is then lowered leaving the tester ready for another test.

The operation of the tester having the modification of Fig. 3 is the same as that of Fig. 1 except that instead of setting the collar 126 (Fig. 1), the number of major load weights at the bottom of the stack that are to be used are allowed to remain free, while the lowest weights of the weights above is secured above the active weights by means of the screws 97', and are thus not applied to the hanger rod.

I claim as my invention:

1. In combination, an elevating post; an arm over said post; a vertically movable indentor plunger on the arm over the post; a beam fulcrumed near one end on the arm and intermediately connected to the plunger; weights carried on the free end part of the beam; an intermediately fulcrumed lever having one arm operatively connected to the beam between the plunger and weights; and a weight on the other arm of the lever sufficiently heavy to counterbalance the weight of the beam.

2. A combination as in claim 1 comprising a gauge operatively connected to said lever.

3. In combination, an elevating post; an arm over said post; a vertically movable indentor plunger supported on the arm over said post; a downwardly pointed fixed knife edge transverse to the arm near and frontward of the plunger, the plunger having an upper seat; a post in said seat; a beam in the arm and having upper and lower seats receiving the fixed knife edge and said post respectively, the beam extending to the rear of the arm, a rod secured in the outer end of the beam in alinement with the axis of the beam; a counterbalancing weight adjustably secured on the rod; a hanger rod suspended from the active free end of the beam; weights on said rod; a dial gauge; actuating means operatively connecting the plunger to the gauge; and means to change the operating ratio of the actuating means to ratios respectively adapted for superficial and regular testing.

4. In a hardness tester, in combination, a vertically movable indentor plunger; a downwardly pointed fixed knife edge near the plunger; a beam having at one end an upper seat receiving the fixed knife edge; means transmitting stress from the plunger to the part of the beam near said seat; a counterbalancing weight adjustably secured on the fulcrum end of the beam in alinement with the axis of the beam; a hanger rod suspended from the active free end of the beam; weights on said rod; a dial gauge; actuating means operatively connecting the plunger to the gauge; and means to change the operating ratio of the actuating means to ratios respectively adapted for superficial and regular testing.

5. A hardness tester comprising an elevating post; an arm over said post; a vertically movable indentor plunger on the arm over said post; a downwardly pointed fixed knife edge transverse to the arm near and frontward of the plunger, the plunger having an upper seat; a post in said seat; a beam in the arm and comprising a seat block having upper and lower seats receiving the fixed knife edge and post respectively, rigidly connected spaced side plates secured to the sides of said block and extending to the rear of the arm, a rod secured in the outer end of the block in alinement with the axis of the beam; a counterbalancing weight adjustably secured on the rod and adjustable distances sufficient to adapt the beam for superficial or regular testing; a hanger rod suspended from the active free end of the beam; weights on said rod; a dial gauge; actuating means operatively connecting the plunger to the gauge; and means to change the operating ratio of the actuating means to ratios respectively adapted for superficial and regular testing.

6. In combination, an elevating post; an arm over said post; horizontal flexible strips one above the other mounted fast on one end in the arm; a vertically movable indentor plunger in the arm over the post and mounted fast on the other end of the strips and having an upper seat; a downwardly pointed fixed knife edge transverse to the arm near and frontward of the plunger; a vertical post having upper and lower hearing ends, the lower end seating in said seat, the upper end being disposed substantially as high as said fixed edge; a beam constructed and adapted for superficial and regular testing extending longitudinally substantially from end to end of the arm and comprising a seat block having upper and lower seats receiving the fixed knife edge and upper bearing end respectively, spaced side plates secured to the sides of said block and extending to the rear of the arm, and transverse rivets rigidly connecting the plates at the margins of the plates and a knife edge pin connecting the free ends of the plates and formed with an upwardly pointed knife edge; a threaded rod secured in the outer end of the block in alinement with the axis of the beam; a counterbalancing weight adjustably secured on the threads of the rod to counterbalance the weight of the beam; a hanger rod having an upper ring suspended on said knife edge pin; minor and major load weights on said rod; a dial gauge; actuating means operatively connecting the plunger to the gauge; and means to change the operating ratio of the actuating means to ratios respectively adapted for superficial and regular testing.

7. In combination, an elevating post; an arm over said post; a vertically movable plunger supported on the arm having an indentor on the lower end over the post; a beam fulcrumed at one end on the arm and intermediately connected to the plunger; a hanger rod on the free end of the beam; weights carried on said rod; an indicating dial gauge on the arm having an upwardly projected downwardly biased weighted operating spindle; a link pivoted to the beam between the plunger and weights and extending upwardly of the arm; a lever having its rear end pivoted to said link and having its front end weighted and connected to the operating spindle of the dial gauge; the intermediate part of the lever having a pair of downwardly projecting front and rear transverse knife edges disposed distances from the link equal to about one half and one fourth the length of the lever; and an adjustable slide plate on the arm having separate fulcrum faces disposable one at a time under either of said knife edges; said distances being such that they adapt the dial gauge for superficial and regular testing.

8. In a tester, in combination, an elevating post; a frame; a pair of strips, one above the other, mounted fast at one end on the frame; a vertically movable indentor plunger over the post mounted on the other end of the strips; a beam strong enough for regular testing fulcrumed at one end on the frame and intermediately connected to the plunger; and a weight on the free end of the beam; said strips being upwardly biased enough to adapt the beam for superficial testing.

9. In combination, an elevating post; an arm over said post; a support for said arm; horizontal flexible strips one above the other mounted fast at one end on the arm; a box having upper and lower members secured to the free ends of said strips; the lower member being provided with a downwardly extended plunger having a lower indentor over the post; a beam strong enough for regular testing fulcrumed at one end on the arm and intermediately operatively connected to the plunger; a weight on the free end of the beam; and a gauge operatively connected to the plunger; said strips being upwardly biased enough to adapt the beam for superficial testing.

10. In combination, a base; a hollow standard thereon; an elevating post in the base; an upwardly open horizontally extending hollow arm mounted at one end on said standard over said base and provided at the front end with a lower opening alined with said post; a fixed frame-like box mounted fast in the rear end of the arm providing horizontal upper and lower members transversely extending across the arm; parallel horizontal flexible spring metal strips mounted on faces of said members and extended horizontally to near the free end of the arm; a movable frame-like box having upper and lower members across the arm over said opening respectively secured fast flat against the inner faces of said strips; the lower member of the movable box being provided in its upper face with a knife-edge seat transverse to the arm, and at the lower face with a downwardly extended plunger passing through said opening over the post and having a lower indentor; a beam fulcrumed at the front end in the arm and provided with a lower seat over said knife edge seat; a post between said seats; a hanger rod on the free end of the beam; major load weights carried on said rod; and a dial gauge operatively connected to the beam.

11. In combination, a base; a hollow standard thereon; an elevating post vertically slidable in said base; a hollow arm mounted at its rear end on said standard and disposed over said post and having a front end wall; horizontal flexible strips one above the other mounted fast in the rear end on the arm and extended to near the front wall; a box having upper and lower members secured to the free ends of said strips; the lower member being provided at its upper face with a seat, and at the lower face with a downwardly extended plunger having a lower indentor over the post; a downwardly pointed fixed knife edge mounted on the inner upper part of said front end wall transverse to the arm near and off-set from the movable box; a vertical post in the box transverse to the arm and having upper and lower bearing points, the lower point seating in said seat, the upper point being disposed substantially as high as said fixed edge; a beam extending longitudinally substantially from end to end of the arm and having upper and lower seats receiving the fixed edge and upper point respectively; a hanger rod suspended from the active free rear end of the beam in the standard; load weights carried on said rod; and a dial gauge operatively connected to the beam.

12. A hardness tester suitable for either superficial or regular testing comprising in combination, a specimen support; a plunger carrying an indentor; means for effecting relative approach between the support and indentor; a beam constructed and adapted for superficial and regular testing connected to the plunger; an indicator; actuating means operatively connecting the beam with the indicator; means for changing the operating ratio of the actuating means to ratios respectively adapted for superficial and regular testing; a loading system including minor and major load weights supportable by the beam and means for selectively applying said weights to the beam; and means for normally counterbalancing the beam to render the weight of the beam ineffective in the loading system.

13. A hardness tester suitable for both superficial and regular testing comprising, in combination, a specimen support; an indentor; means for effecting relative approach between the support and the indentor; a beam operatively connected to the indentor; an indicator; actuating means operatively connecting the indentor with the indicator and constructed and adapted to be changed to have one operating ratio suitable for regular testing or another operating ratio suitable for superficial testing; means for selectively changing the actuating means from one of said ratios to the other; load weights supportable by the beam; and means for counterbalancing the beam to render the weight of the beam ineffective in the loading system.

14. A hardness tester suitable for both superficial and regular testing comprising, in combination, a specimen support; a plunger carrying an indentor; means for effecting relative approach between the support and the indentor; a beam operatively connected to the plunger; the beam being strong enough for regular testing and light enough for superficial testing; an indicator; actuating means operatively connecting the beam with the indicator and adjustable to have one operating ratio suitable for regular testing or an operating ratio suitable for superficial testing; means for selectively changing the actuating means from one of said ratios to the other; minor and major load weights supportable by the beam; means for normally counterbalancing the beam to render the weight of the beam ineffective in the loading system; and means for selectively applying to the beam the proper amount of said weights for regular or superficial testing.

15. In a hardness tester, a beam fulcrumed at one end and carrying load weights at the other end, a plunger connected to the beam and carrying an indentor; a dial gauge having an actuating spindle; a link operatively connected to the beam; a lever member pivotally connected to said link and spindle; a movable member; one of said members having projecting knife edges near and projecting toward the other of said members and disposed different distances from the spindle; said other of said members having engagement faces adapted one at a time to engage one of said knife edges; said distances being such that they adapt the dial for superficial and regular testing.

16. A hardness tester suitable for both superficial and regular testing comprising, a fulcrum support; a fulcrum thereon; a light weight beam fulcrumed near one end on the fulcrum; weight supporting means for supporting minor and major load weights on the other end of the beam; a light weight plunger operatively connected to the beam near the fulcrum and carrying an indentor; an indicator operatively connected to the plunger; a specimen support; means for causing relative approach between the specimen support and indentor; the beam being strong enough to exert a pressure of 150 kg. on the indentor for regular testing, and light enough for superficial testing; and biasing means engaging the beam between the fulcrum and said other end only for biasing the beam upward; the weight of the beam and weight supporting means, the plunger and the force and weight of the biasing means being such that pressure exerted by the beam and the weight supporting means on the indentor is less than about 3 kg.

17. A hardness tester suitable for both superficial and regular testing comprising a fulcrum; a beam fulcrumed at one end on the fulcrum; weight supporting means on the other end of the beam, a plunger operatively connected to the beam near the fulcrum and carrying an indentor; a specimen support; means for effecting relative approach between the indentor and specimen support; and means for biasing the beam upward engaging the beam only between the fulcrum and said other end.

18. A hardness tester suitable for both superficial and regular testing comprising a fulcrum support; a fulcrum thereon; a light weight beam fulcrumed at one end on the fulcrum; a plunger operatively connected to the beam near the fulcrum and carrying an indentor; a specimen support; means for effecting relative approach between the specimen support and the indentor; weight supporting means for supporting minor and major load weights on the free end of the beam, the beam being strong enough to exert a pressure of 150 kg. on the indentor for regular testing, and light enough for superficial testing; biasing means for biasing the beam upward; the weight of the beam, the weight supporting means and the plunger and the force of the biasing means being such that pressure exerted by the beam, the plunger and the weight supporting means on the indentor is less than about 3 kg.; an indicator; actuating means operatively connecting the beam with the indicator and adjustable to have a regular operating ratio suitable for regular testing or a second operating ratio about twice the regular ratio for superficial testing; and movable means movable from one position to another position for selectively changing the actuating means from one of said ratios to the other; and means for automatically positioning said movable means in said positions.

19. A hardness tester for both superficial and regular testing comprising a fulcrum; a light weight beam fulcrumed at one end on the fulcrum; weight supporting means on the other end of the beam; a plunger operatively connected to the beam near the fulcrum and carrying an indentor; a specimen support; means for effecting relative approach between the indentor and specimen support; the beam being strong enough for regular testing, and light enough for superficial testing; an indicator; and actuating means operatively connecting the beam with the indicator and having a movable ratio changing means movable from one position to another to adjust the operating ratio between the actuating means and the indentor for regular testing or for superficial testing; and means for automatically positioning said movable means accurately in said positions when moved thereto.

20. A hardness tester suitable for both superficial and regular testing comprising a fulcrum; a light weight power beam fulcrumed at one end of the fulcrum; weight supporting means for supporting load weights on the other end of the beam; a plunger operatively connected to the beam near the fulcrum and carrying an indentor; a specimen support; means for effecting relative approach between the indentor and specimen support; an intermediately fulcrumed lever operatively connected at one end to said beam between said fulcrum and said other end; and a weight at the other end of said lever.

21. A hardness tester suitable for both superficial and regular testing comprising a fulcrum; a light weight beam fulcrumed at one end on the fulcrum; weight supporting means for supporting load weights on the other end of the beam; a plunger operatively connected to the beam near the fulcrum and carrying an indentor; a specimen support; means for effecting relative approach between the indentor and specimen support; a lever operatively connected at one end to said beam between the fulcrum and said other end; a weight at the other end of said lever; an indicator connected to said other end of the lever; and a movable fulcrum intermediately supporting said lever and movable to two different positions relative to the lever to give ratios adapting the indicator for superficial and regular testing.

22. In a hardness tester, a plunger carrying an indentor; load means pressing on the plunger; a dial gauge having an actuating spindle; a link operatively connected to the plunger for movement when the plunger moves; a lever member pivotally connected to said link and spindle; and a movable member; one of said members having projecting knife edges near and projecting toward the other of said members and disposed different distances from the spindle; said other of said members having engagement faces adapted one at a time to engage one of said knife edges; said distances being such that they adapt the dial for superficial and regular testing.

References Cited in the file of this patent

UNITED STATES PATENTS

| Number | Name | Date |
|---|---|---|
| 1,035,700 | Harrison | Aug. 13, 1912 |
| 1,212,027 | Dobson | Jan. 9, 1917 |
| 1,232,782 | Field | July 10, 1917 |
| 1,497,372 | Green | June 10, 1924 |
| 1,590,426 | Dayton et al. | June 29, 1926 |
| 1,622,455 | Lewis | Mar. 29, 1927 |
| 1,634,444 | Benton | July 5, 1927 |
| 1,991,826 | Taylor | Feb. 19, 1935 |
| 2,030,475 | Shore | Feb. 11, 1936 |
| 2,053,472 | Gogan | Sept. 8, 1936 |
| 2,188,992 | Wolpert et al | Feb. 6, 1940 |
| 2,217,089 | Yates | Oct. 8, 1940 |
| 2,241,347 | Hem | May 6, 1941 |
| 2,319,208 | Clark | May 18, 1943 |
| 2,362,941 | Sklar | Nov. 14, 1944 |
| 2,385,958 | Woxen | Oct. 2, 1945 |
| 2,407,583 | Sprigg | Sept. 10, 1946 |
| 2,418,916 | Weaver | Apr. 15, 1947 |
| 2,429,696 | Merkt | Oct. 28, 1947 |
| 2,550,775 | Clark | May 1, 1951 |
| 2,643,544 | Chester | June 30, 1953 |

FOREIGN PATENTS

| Number | Country | Date |
|---|---|---|
| 353,729 | Great Britain | July 30, 1931 |
| 603,531 | Germany | Oct. 3, 1934 |
| 657,988 | Germany | Mar. 18, 1938 |
| 239,040 | Switzerland | Dec. 3, 1945 |
| 916,869 | France | Aug. 26, 1946 |
| 584,246 | Great Britain | Jan. 10, 1947 |